No. 805,178. PATENTED NOV. 21, 1905.
G. W. ZASTROW.
MACHINE FOR TREATING PINEAPPLES.
APPLICATION FILED JUNE 5, 1905.
3 SHEETS—SHEET 1.
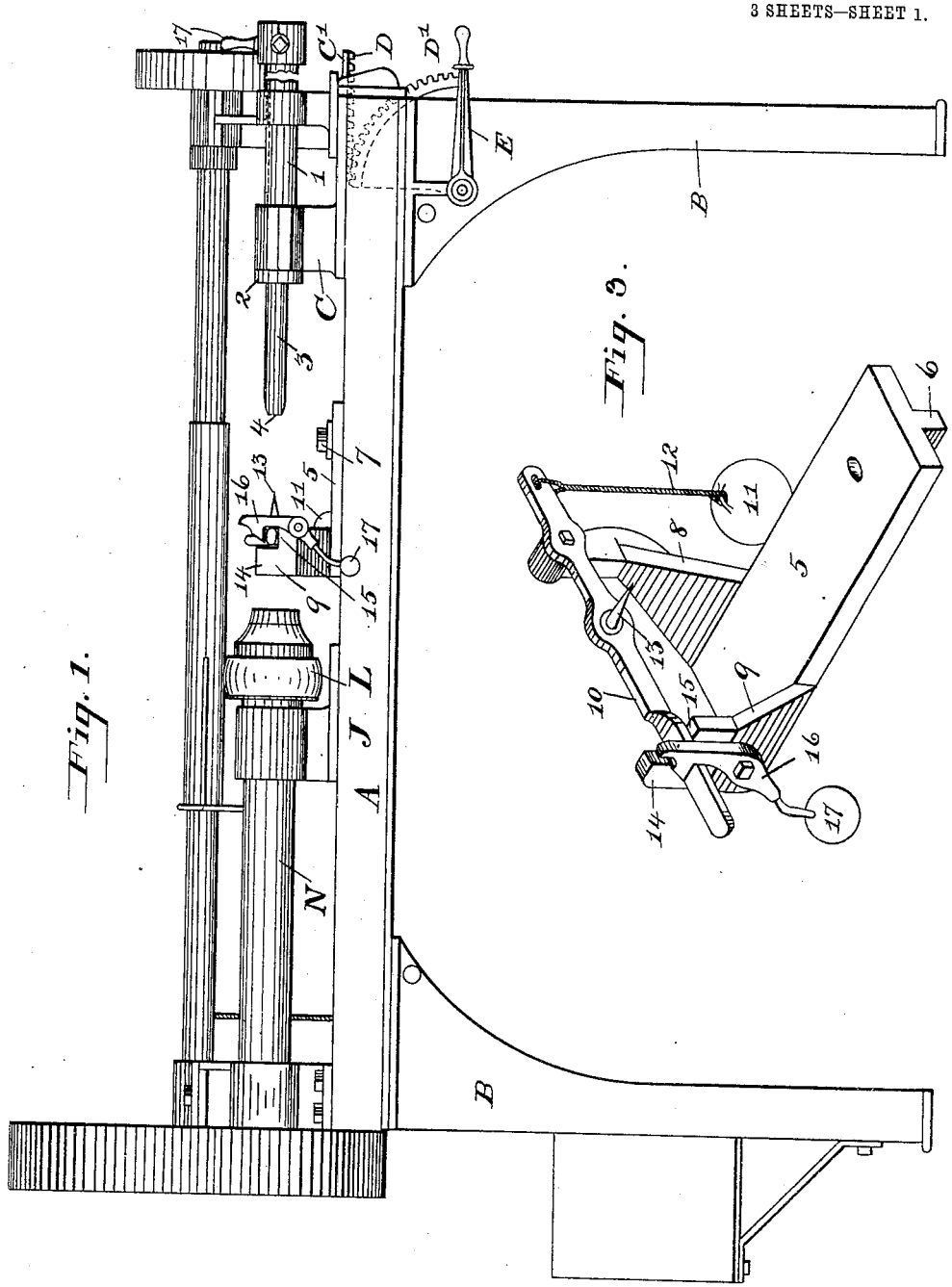
Witnesses
Samuel J. Williamson
G. Ferdinand Vogt
Inventor.
George W. Zastrow
By Mann & Co,
Attorneys.

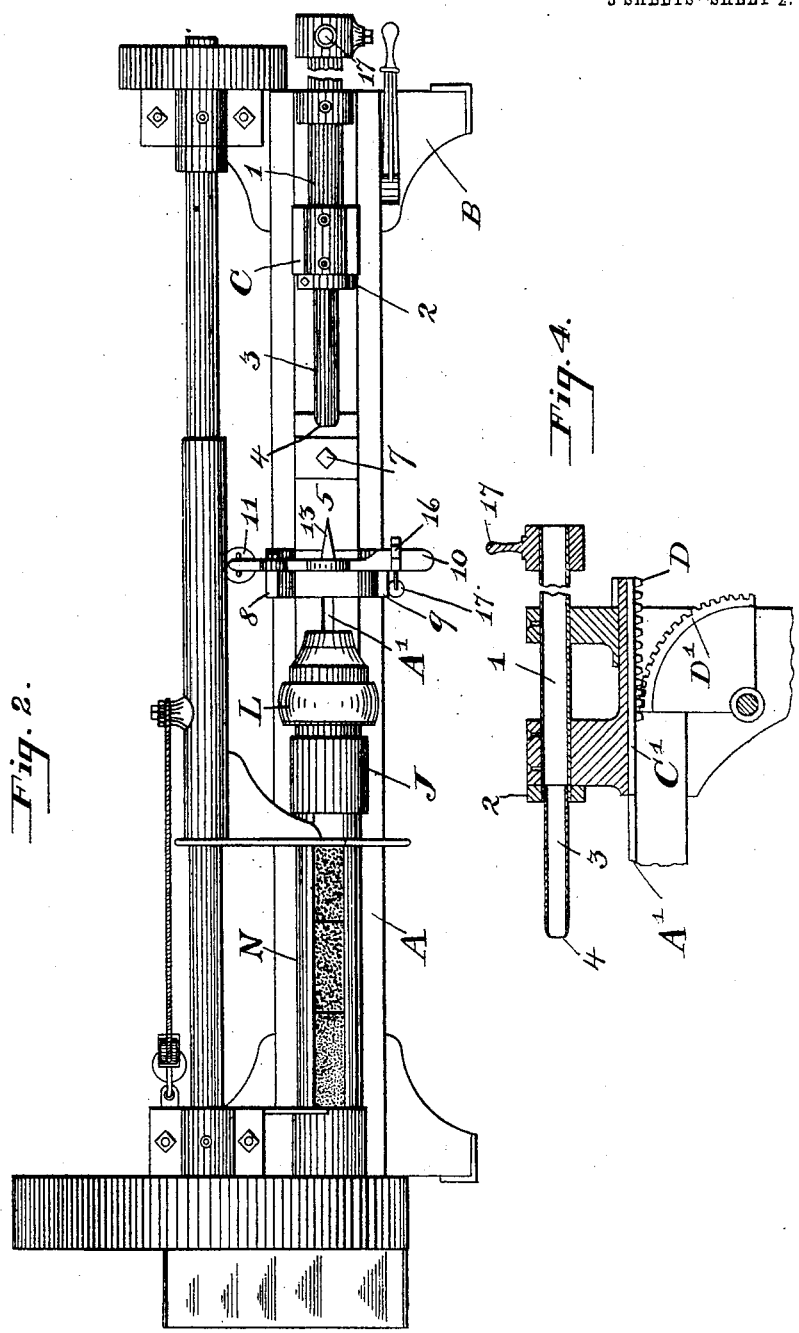

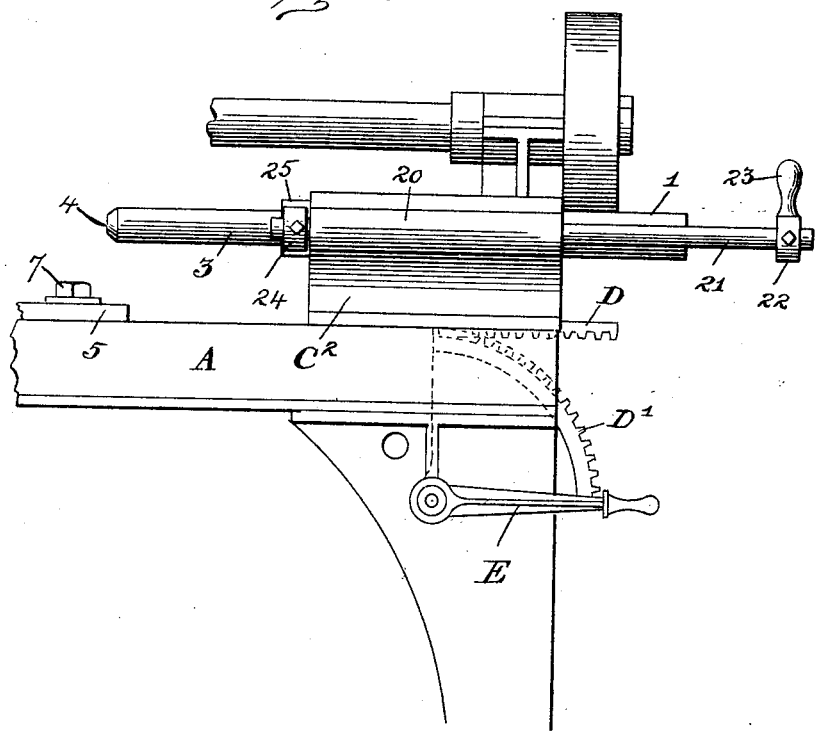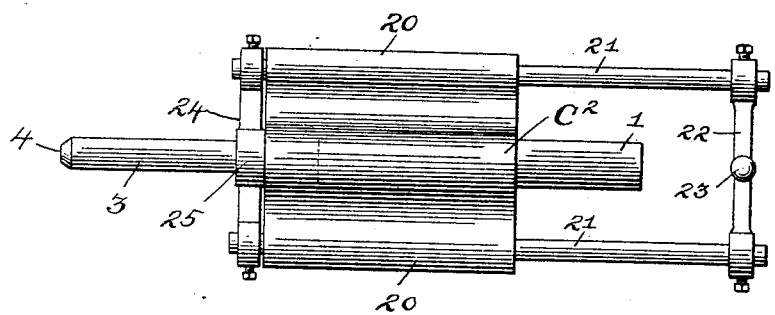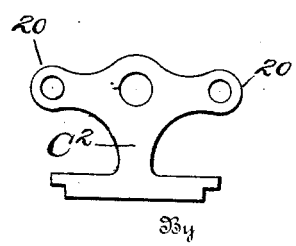

UNITED STATES PATENT OFFICE.

GEORGE W. ZASTROW, OF BALTIMORE, MARYLAND.

MACHINE FOR TREATING PINEAPPLES.

No. 805,178.            Specification of Letters Patent.            Patented Nov. 21, 1905.

Application filed June 5, 1905. Serial No. 263,747.

*To all whom it may concern:*

Be it known that I, GEORGE W. ZASTROW, a citizen of the United States, residing at Baltimore, in the State of Maryland, have invented certain new and useful Improvements in Machines for Treating Pineapples, of which the following is a specification.

This invention relates to improvements in machines for treating fruit, such as pineapples, to prepare them for canning.

The improvement is illustrated as applied to a type of machine shown in my patents No. 482,893, dated September 13, 1892, and No. 735,649, dated August 14, 1903; but it will be understood that the invention may be employed in other types of machines.

One object of the present invention is to provide an improved device for cutting and holding the pineapple at one end and while held in such position to insert a coring device at the opposite end.

Another object of the invention is to combine in a single machine an improved mechanism by which the core of the fruit under treatment may first be removed and the fruit afterward sized, sliced, and segmented, if desired.

Other objects and advantages attained by means of the improvement will be hereinafter pointed out.

The invention is illustrated in the accompanying drawings, in which—

Figure 1 illustrates a side elevation of a machine provided with my improvement. Fig. 2 illustrates a top plan view of the same. Fig. 3 illustrates a detail perspective view of the centering device. Fig. 4 shows a sectional elevation of a device for removing the core. Fig. 5 illustrates a side elevation of another form of core-removing device applied to the machine. Fig. 6 shows a plan view of the coring device, and Fig. 7 illustrates an end elevation of the core-remover carrier.

Referring to the drawings by letters and figures, A designates the bed-piece of the machine, which consists of a hollow casting with a central longitudinal slot A' in its top and is supported on suitable legs B. A carriage C has position on top of said bed-piece A at one end of the latter, and said carriage is provided on its bottom with a guide-rib C', which projects into said slot and slides therein. This guide-rib C' is provided with a rack D, which has position within the bed-piece A. A segment-gear D' is mounted on a shaft and engages said rack, and said gear is operated by a lever E on the end of said shaft. By means of this lever the carriage may be moved longitudinally on top of the bed-piece.

A tube 1 extends horizontally across the top of the carriage and at its forward end is provided with a collar 2, and a coring-tube 3 has one end inserted within the end of said tube 1 and projects horizontally or parallel with the bed-piece. The projecting end of this coring-tube is beveled or turned inwardly, so as to form a cutting edge 4 and also to reduce the interior diameter of the tube at the end, as seen in Fig. 4. Mounted on the bed-piece A and beyond the cutting edge 4 of the coring-tube 3 is a table 5, provided on its bottom with a guide-rib 6, which passes down into the slot A' and prevents lateral movement, but permits the table to be adjusted in a lengthwise direction in front of the tube 3. A suitable bolt 7 passes down through the table and secures the latter in its adjusted position.

An arm 8 projects upwardly from one side of the table 5, and an arm 9 also projects upwardly from the opposite side of said table. A bar 10 is pivoted near one end to the upper end of the arm 8, and said bar is of a length that will permit of its projecting beyond the arm 9 when swung on its pivot to a horizontal position. This bar 10 near its pivoted end is provided with a weight 11, which in the present instance is suspended by a cord 12 from the projecting end of said bar. It is obvious, however, that this weight 11 may be fitted into or cast integral with the end of said bar, as its function is to raise the free end of the bar when it is released, as will presently be described. At a point midway between the two arms 8 and 9 the bar 10 is provided with a pointed or cone-shaped centering-pin 13, which when the bar is in a horizontal position projects horizontally from the front vertical face of the bar and in line with the coring-tube 3, so that said tube when moved horizontally with the carriage C will take over said pin 13.

The arm 9 is provided with a vertically-projecting stop 14 and a seat 15 adjacent said stop, on which the free end of the bar 10 rests when in the horizontal or operative position, as clearly seen in Fig. 3. When in this horizontal position, the rear vertical face of said bar or the surface opposite that from which the cone-pin projects has position at the side of the projecting stop 14, so that said bar will be supported or backed up at its free end to withstand the horizontal strain placed against it from the opposite side. A latch 16 is pivoted to the outer side of the vertical arm 9 and near its upper end is provided with a laterally-projecting hook, which takes over the top surface of the free end of the bar 10 and holds said end down on the seat 15 against the tendency of the weight 11 to raise said free end. The latch 16 is pivoted so as to swing in a vertical plane and at its lower end curves forwardly beyond its center or pivot-point and at said curved end carries a weight 17, which serves to keep the hook end of the latch pressed toward the stop 14 and over the end of the bar 10.

A standard J is stationed at a suitable place on the bed-piece A, and this standard carries a rotary head L, having the form of a pulley, around which a belt (not shown) may be run to revolve said head. The particular construction and arrangement of this head are not a part of the present invention and are shown in my said former patent No. 482,493 and need not now be described in detail. Briefly stated, however, this rotary head L receives the pineapple after the core has been removed, as has been described, and sizes it or removes the outer rind and will pass it into the slotted tube N. In some suitable manner the pineapple is then fed through the tube N, preferably by mechanism such as described in my Patent No. 735,649, comprising a horizontally-movable sleeve, carrying an arm which projects through the slot and into the tube and feeds the treated pineapples to a rotary cutter-head at the end of the tube, where the pineapples are sliced and deposited into a suitable receptacle.

It will be noted that the bar 10 and its centering-pin 13 are interposed or have position between the coring-tube 3 and the rotary head L and when in the operative or horizontal position the bar extends across the bed and serves as an abutment in front of the cutting end 4 of said tube and the pin 13 will assume a position in line with the opening in the end of said tube.

Briefly described, the operation is as follows: Assuming the bar 10 to be in the horizontal position, the pineapple is held horizontally by the operator, so that the center of its core will register with the point of the centering-pin 13 and is then pushed toward the flat side of the bar, so that the pin will be embedded in said core and the pineapple thus centered in front of the tube 3. The free end of the lever E is then raised and moved in a direction toward the bar 10, and this movement rocks the shaft on which the lever is mounted and moves the segment-gear D', rack D, and carriage C in a direction toward the bar 10 and also brings the cutting edge 4 of the core-tube 3 in alinement with the core at the other end of the pineapple. The continued movement of the lever E will force the tube 3 through the pineapple, the edge 4 of said tube cutting its way around the exterior of the core. It will be understood that while the tube is being forced through the pineapple the latter is backed up by the bar 10 and the stop 14 and the core of the pineapple will pass through the tube 3 and 1, while the desirable portion of the fruit will slide over the exterior of said tube. The forward movement of the tube 3 is continued until the cutting edge 4 passes around the pin 13, at which time the core is completely severed from the pineapple. The movement of the tube 3 is then slightly reversed by the reversal of the lever E, and this reversal is merely for the purpose of withdrawing the tube 3 from around the pin 13 and also of withdrawing the core from the said pin. In order to insure that the core will pull away from the pin and remain in the tube 3 when the movement of the latter is reversed, the interior diameter of the tube is slightly reduced at the end, so that the core will swell after passing through said reduced end and bind sufficiently to prevent its return through the reduced end when withdrawn. When the tube has been withdrawn sufficiently to clear the end of the pin 13, the operator will move the lower weighted end of the latch 16 and release the free end of the bar 10, whereupon the weight 11 at the opposite end of the bar will cause the bar and pin to raise. At this point the operator will grasp the handle 17 and slide the tube 1 and coring-tube 3 through the bearing C', thus forcing the pineapple and coring-tube into the rotary head L, where the pineapple is sized and afterward sliced, as described in my former patent. The withdrawal of the coring-tube is accomplished by simply reversing the motion of the tube 1 with the aid of the handle 17, and the carriage and tubes are then returned to their original position by means of the lever E.

In the form of corer shown in Figs. 5, 6, and 7 the carriage or carrier $C^2$ is movable on the bed-piece A through the aid of the rack D, segment-gear D', and lever E. This carrier is provided in the present instance at opposite sides with a bearing 20, and parallel rods 21 extend through said bearings and at one end are connected by a frame 22, which is provided with a suitable operating-handle 23. The other ends of the rods are connected by a cross-head 24, which has a circular central portion 25, which extends around the coring-tube 3 and slides longitudinally thereon when the rods are moved through the bearings 20. By means of this device the fruit may be pushed from the coring-tube into the head L, where the pineapple is sized and, if desired, segmented and made ready for slicing, as before described.

Having thus described my invention, what I claim as new, and desire to secure by Letters Patent, is—

1. In a machine of the character described the combination of a bed; a rotary head; a tube movable in a direction toward or away from said head and in line with the axis of said head; a movable abutment interposed between the head and tube, and means whereby the abutment may be moved to permit the tube to be moved beyond it toward the head.

2. In a machine of the character described the combination of a bed; a rotary head sustained by said bed; a carrier also sustained by said bed; a tube movable with the carrier in a direction toward and away from said head; a bar pivotally sustained in the path of said tube and interposed between the tube and said rotary head, and means whereby the tube may be moved toward the pivoted bar.

3. In a machine of the character described the combination of a bed; a rotary head sustained by said bed; a carrier also sustained by said bed; a tube movable with the carrier in a direction toward said head; a bar pivoted so as to swing across said bed in the path of said tube and between said tube and rotary head; a latch for holding the bar in front of the tube, and means for automatically moving said bar when the latch is released.

4. In a machine of the character described the combination of a bed; a rotary head sustained by said bed; a tube movable lengthwise in a direction toward said head; a bar mounted between said head and tube; a centering device carried by said bar and arranged to be alined with said tube; means for moving the bar out of the path of the tube whereby to permit the tube to pass toward the head.

5. In a machine of the character described the combination of a bed; a rotary head; a tube movable in a direction toward said head; arms projecting from said bed; a bar pivoted to one of said arms and arranged to swing across said bed between said head and tube; a stop projecting from the other arm and between the bar and head; a latch for holding the bar in a position in the path of the tube, and means for automatically swinging the bar out of the path of the tube when the latch is withdrawn.

In testimony whereof I affix my signature in presence of two witnesses.

GEORGE W. ZASTROW.

Witnesses:
CHARLES B. MANN, Jr.,
THOS. KELL BRADFORD.